United States Patent
Marques et al.

(10) Patent No.: US 8,904,785 B2
(45) Date of Patent: Dec. 9, 2014

(54) TURBINE WASTEGATE

(75) Inventors: Manuel Marques, Richardmenil (FR); Jean-Jacques Laissus, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 5 days.

(21) Appl. No.: 13/613,250

(22) Filed: Sep. 13, 2012

(65) Prior Publication Data

US 2014/0072410 A1    Mar. 13, 2014

(51) Int. Cl.
| | | |
|---|---|---|
| *F02D 23/00* | (2006.01) | |
| *F02B 37/18* | (2006.01) | |
| *F01D 17/20* | (2006.01) | |
| *F01D 25/24* | (2006.01) | |
| *F01D 17/10* | (2006.01) | |

(52) U.S. Cl.
CPC ........... *F02B 37/186* (2013.01); *F05D 2220/40* (2013.01); *F01D 17/20* (2013.01); *F02B 37/183* (2013.01); *F01D 25/24* (2013.01); *F01D 17/105* (2013.01); *F02B 37/18* (2013.01)
USPC .............. 60/602; 415/144; 251/298; 251/299

(58) Field of Classification Search
CPC ...... F02B 37/18; F02B 37/183; F02B 37/186; F01D 17/105; F01D 17/20; F01D 25/24; F05D 2220/40; F05D 2240/14
USPC ...................... 60/602; 251/299, 298, 333, 356
See application file for complete search history.

(56) References Cited

U.S. PATENT DOCUMENTS

| 2,679,864 | A | | 6/1954 | Harke |
|---|---|---|---|---|
| 4,098,085 | A | * | 7/1978 | McDowell ....................... 60/602 |
| 4,121,607 | A | * | 10/1978 | Bader ......................... 137/454.5 |
| 4,480,815 | A | * | 11/1984 | Kreij ............................. 251/298 |
| 4,611,465 | A | | 9/1986 | Kato et al. |
| 4,702,209 | A | * | 10/1987 | Sausner et al. ........... 123/339.27 |
| 4,730,456 | A | * | 3/1988 | Tadokoro et al. ............... 60/602 |
| 4,962,911 | A | | 10/1990 | Soderberg |
| 5,044,604 | A | * | 9/1991 | Topham et al. ................ 251/120 |
| 5,996,348 | A | * | 12/1999 | Watkins .......................... 60/602 |

(Continued)

FOREIGN PATENT DOCUMENTS

| DE | 4439432 C1 | 11/1994 |
|---|---|---|
| DE | 19727141 C1 | 8/1998 |

(Continued)

OTHER PUBLICATIONS

Translation WO 2011108331 A1.*

(Continued)

*Primary Examiner* — Thomas Denion
*Assistant Examiner* — Jason T Newton
(74) *Attorney, Agent, or Firm* — Brian J. Pangrle

(57) ABSTRACT

An assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a torus, for contacting the wastegate seat to cover the wastegate passage. Various other examples of devices, assemblies, systems, methods, etc., are also disclosed.

11 Claims, 12 Drawing Sheets

(56) References Cited

U.S. PATENT DOCUMENTS

| | | | |
|---|---|---|---|
| 6,035,638 | A | 3/2000 | Lamsbach et al. |
| 6,969,048 | B2 * | 11/2005 | Colic et al. ............ 251/357 |
| 7,063,099 | B2 | 6/2006 | Hartley |
| 7,108,244 | B2 * | 9/2006 | Hardin ................... 251/333 |
| 7,214,045 | B2 | 5/2007 | Turner |
| 7,284,542 | B2 | 10/2007 | Wright |
| 7,931,252 | B2 * | 4/2011 | Shindo et al. .......... 251/333 |
| 2001/0010801 | A1 | 8/2001 | Turner |
| 2006/0213195 | A1 | 9/2006 | Leavesley |
| 2006/0239812 | A1 * | 10/2006 | Friedel et al. .......... 415/115 |
| 2007/0068496 | A1 * | 3/2007 | Wright .................. 123/527 |
| 2008/0237526 | A1 * | 10/2008 | Albert et al. ........... 251/356 |
| 2011/0000209 | A1 * | 1/2011 | Boening et al. ......... 60/602 |
| 2011/0173974 | A1 * | 7/2011 | Grabowska ............. 60/602 |

FOREIGN PATENT DOCUMENTS

| | | | |
|---|---|---|---|
| DE | 19853391 A1 | 11/1998 | |
| DE | 19853392 A1 | 11/1998 | |
| DE | 102006046826 A1 | 10/2006 | |
| DE | 102006028800 A1 | 12/2007 | |
| DE | 102009015899 A1 | 10/2010 | |
| EP | 0401615 A1 | 12/1990 | |
| EP | 2489853 A1 | 8/2008 | |
| EP | 1988265 A1 | 11/2008 | |
| EP | 2251533 A1 | 11/2010 | |
| EP | 2444626 A1 | 4/2012 | |
| JP | 1990131032 U1 | 10/1990 | |
| WO | 2009106161 A1 | 9/2009 | |
| WO | 2010039596 A2 | 4/2010 | |
| WO | WO 2011108331 A1 * | 9/2011 | ........ F02B 37/18 |

OTHER PUBLICATIONS

Continental "New Turbocharger with Electrical Waste-Gate Actuation", May 11, 2011 (26 pages).
EP 13 18 3257, Partial European Search Report, Dec. 18, 2013 (5 pages).
EP 12 18 3257, European Search Report, Mar. 6, 2014 (6 pages).
EP 13 18 3258 European Search Report, Dec. 18, 2013 (3 pages).
EP 13 18 3260 European Search Report, Dec. 18, 2013 (5 pages).
EP 13 18 3260 European Examination Report, Jan. 31, 2014 (7 pages).
EP 13 18 3258, European Examination Report, Feb. 14, 2014 (5 pages).
EP 13 18 3257, European Examination Report, Apr. 17, 2014 (7 pages).

* cited by examiner

TURBINE WASTEGATE

TECHNICAL FIELD

Subject matter disclosed herein relates generally to turbomachinery for internal combustion engines and, in particular, to turbine wastegates.

BACKGROUND

A turbine wastegate is typically a valve that can be controlled to selectively allow at least some exhaust to bypass a turbine. Where an exhaust turbine drives a compressor for boosting inlet pressure to an internal combustion engine, a wastegate provides a means to control the boost pressure.

A so-called internal wastegate is integrated at least partially into a turbine housing. An internal wastegate typically includes a flapper valve, a crank arm, a shaft or rod, and an actuator. In a closed position, a wastegate flapper or plug needs to be seated with sufficient force to effectively seal an exhaust bypass (e.g., to prevent leaking of exhaust from a high pressure exhaust supply to a lower pressure region). Often, an internal wastegate is configured to transmit force from an arm to a plug. During engine operation, load requirements for a wastegate vary with pressure differential. High load requirements can generate high mechanical stresses in a wastegate's kinematics components, a fact which has led to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates and wastegate components are described herein, which can optionally provide for improved kinematics, reduced exhaust leakage, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
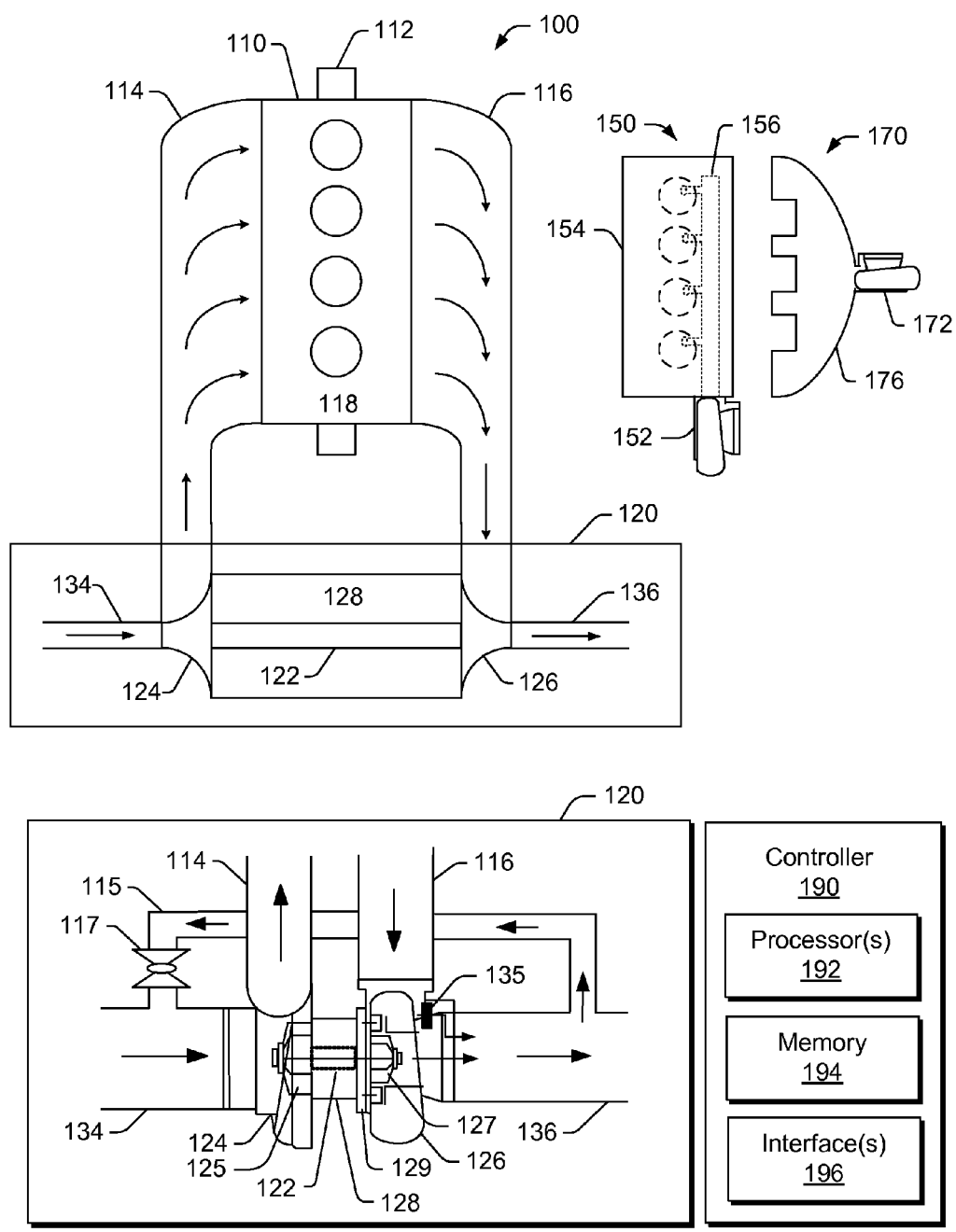
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine 126. The wastegate valve 135 can be controlled to allow at least some exhaust from the exhaust port 116 to bypass the turbine 126. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc.

Figure 2:
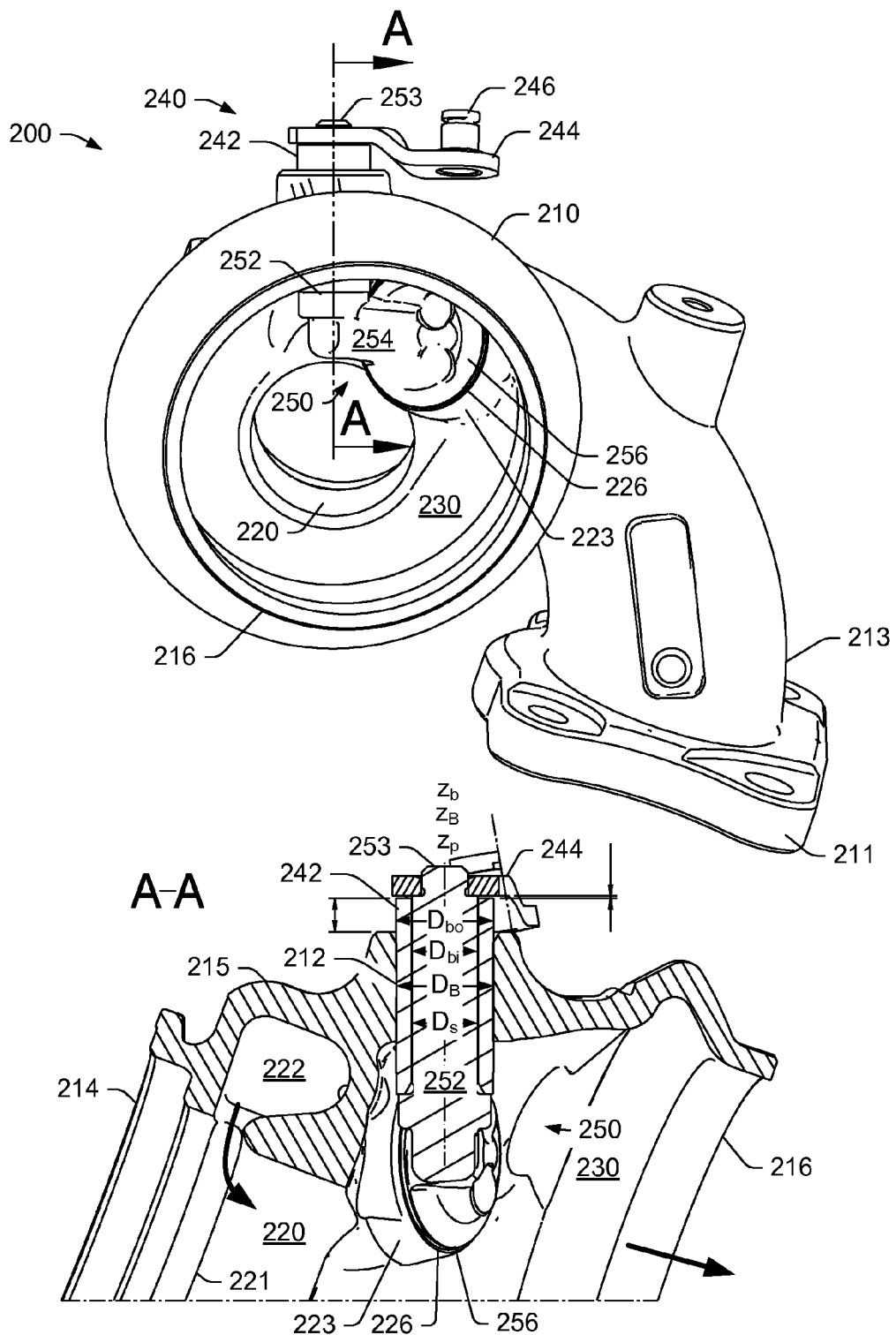
FIG. 2 is a series of view of an example of an assembly that includes a wastegate.

FIG. 2 shows an example of an assembly 200 that includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215, a wastegate wall 223 that extends to a wastegate seat 226, and an exhaust chamber 230. In the example of FIG. 2, the turbine housing 210 may be a single piece or multi-piece housing. As an example, the turbine housing 210 may be a cast component (e.g., formed via sand casting or other casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing includes an inner diameter $D_{bi}$ and an outer diameter $D_{bo}$. In the example of FIG. 2, when the various components are assembled, $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

As an example, the assembly 200 may be fitted to an exhaust conduit of an internal combustion engine via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216. As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216.

In the example of FIG. 2, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

Figure 3:
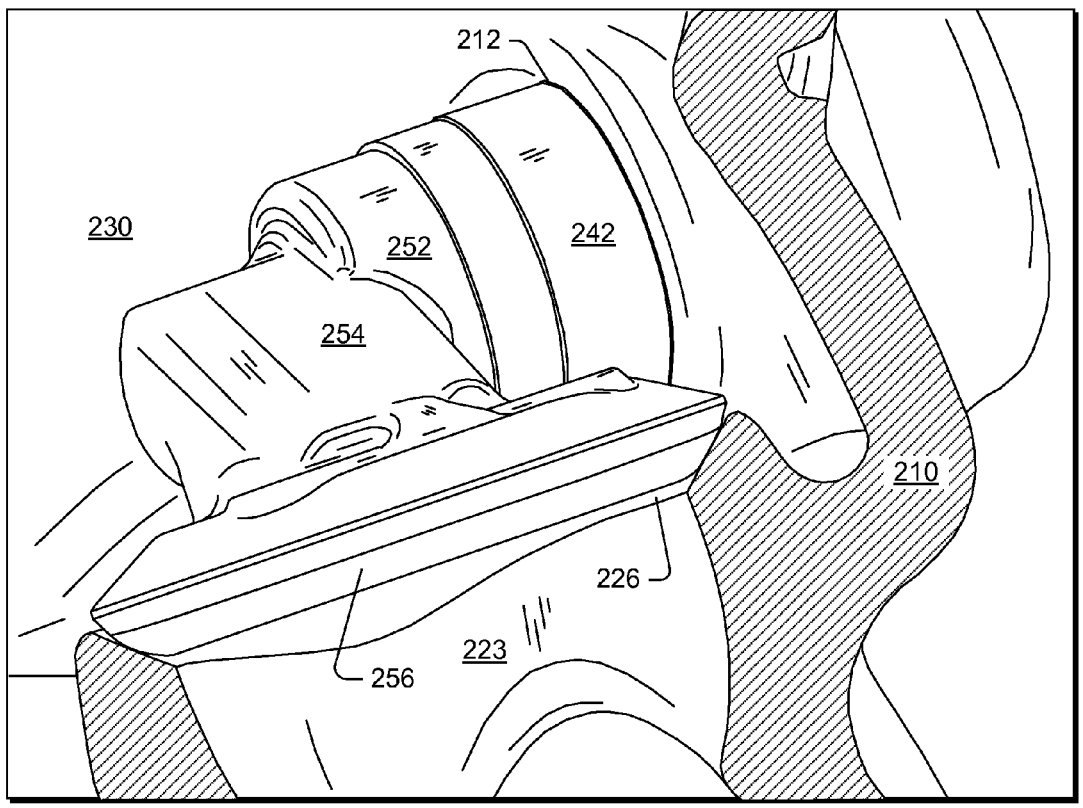
FIG. 3 is a cutaway view of a portion of the assembly of FIG. 2.

FIG. 3 shows an enlarged cutaway view of a portion of the assembly 200 of FIG. 2. As shown, the plug 256 seats in the wastegate seat 226 to seal the wastegate passage defined by the wastegate wall 223, which is part of the turbine housing 210.

Figure 4:
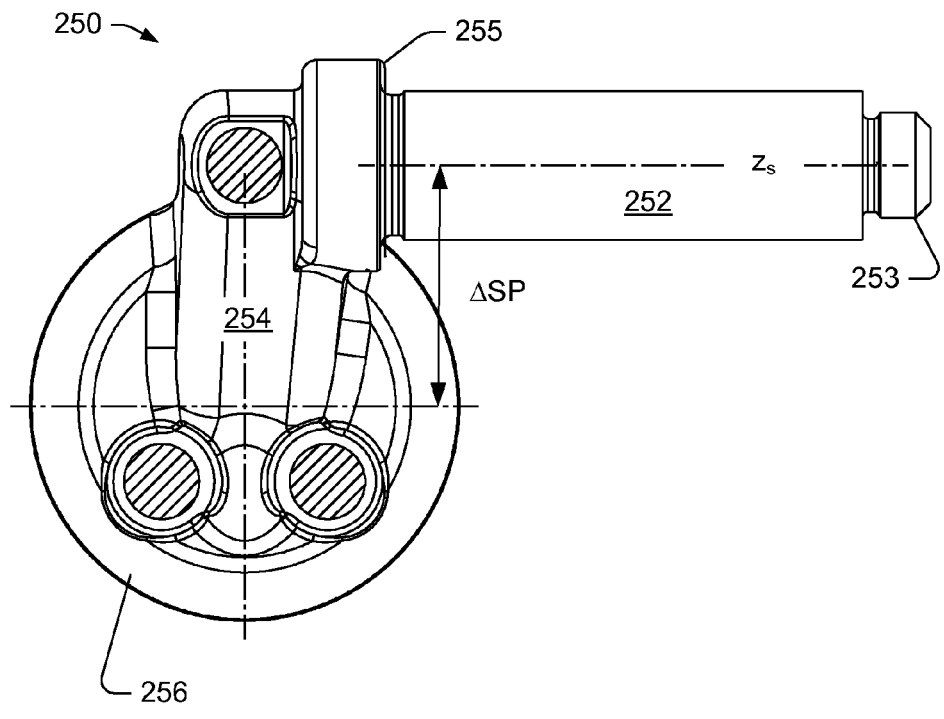
FIG. 4 is a series of views of an example of a wastegate arm and plug.
Figure 4:
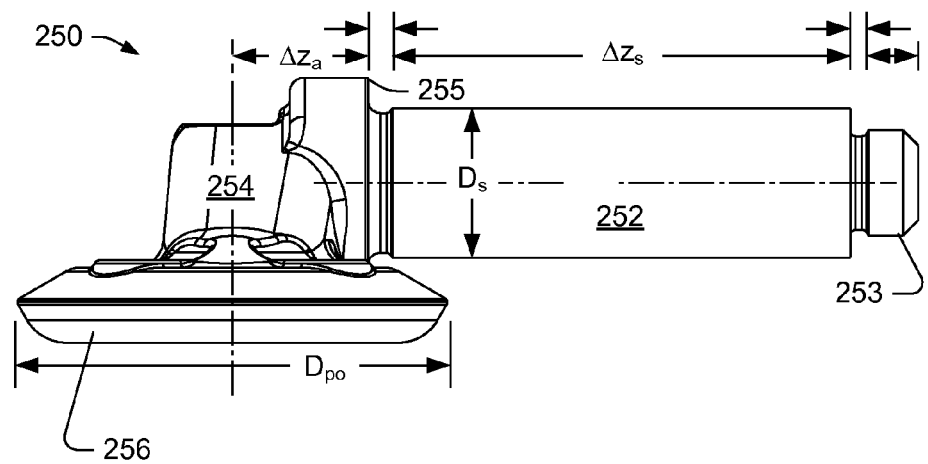

FIG. 4 shows a plan view and a side view of the wastegate arm and plug 250 of the assembly of FIG. 2. As shown, the shaft 252 has a diameter $D_s$ over a length $\Delta z_s$. The arm 254 extends axially outwardly away from the shaft 252 from a shoulder 255 and radially downwardly to the plug 256. An axial dimension $\Delta z_a$ is shown in the example of FIG. 4 as being a distance from the shoulder 255 to a centerline of the plug 256. The plug 256 is shown as having an outer diameter $D_{po}$. A dimension $\Delta SP$ is shown in the plan view as an offset between the axis $z_s$ of the shaft 252 and the centerline of the plug 256. The dimension $\Delta SP$ may be a leg of a triangle that, for example, defines a hypotenuse as a dimension between a rotational axis of the arm 254 and the centerline of the plug 256. FIG. 4 also shows various other features, for example, shaft features such as shoulders, contours, etc.

Figure 5:
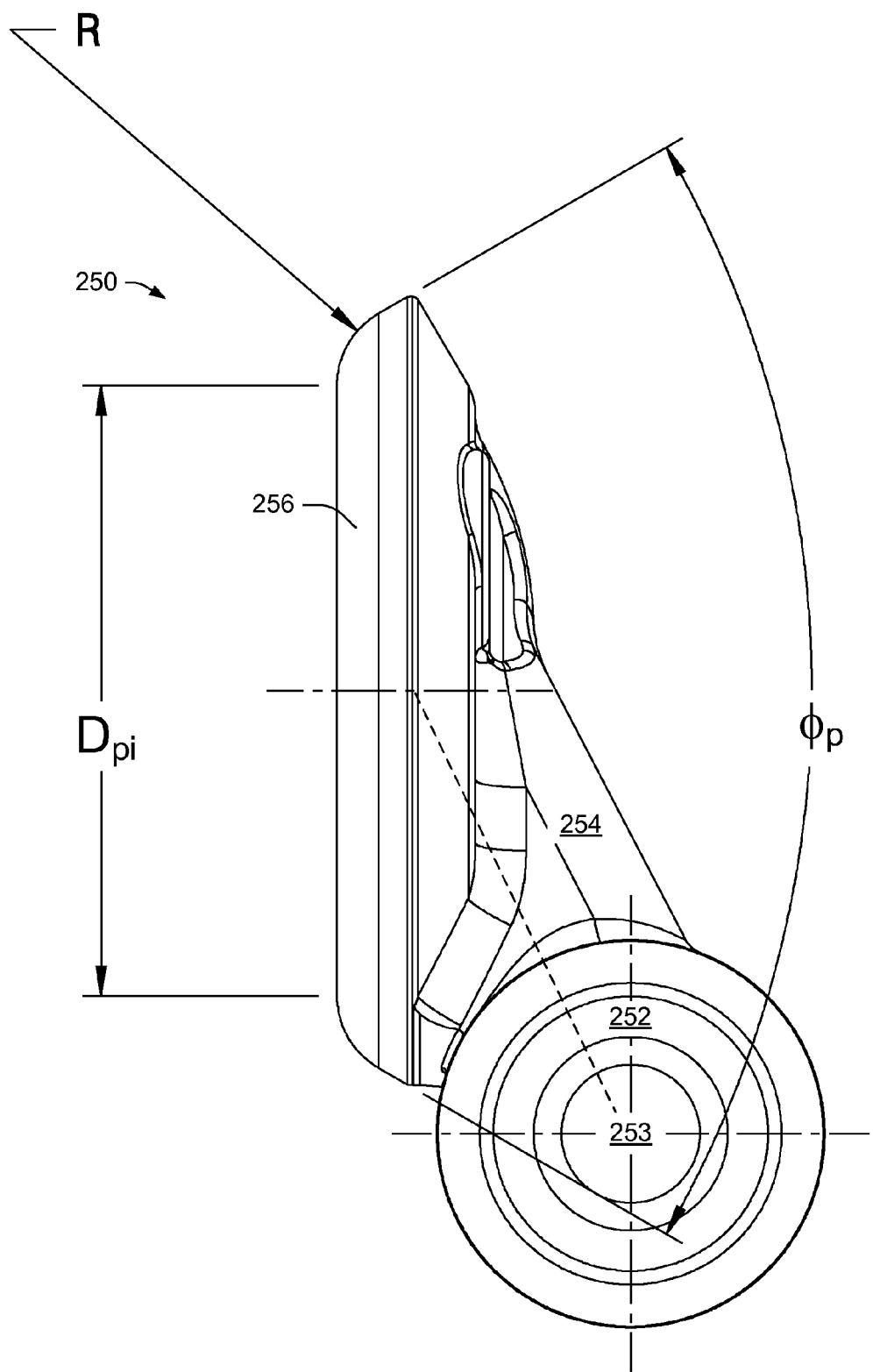
FIG. 5 is a side view of the wastegate arm and plug of FIG. 4.

FIG. 5 shows another side view of the wastegate arm and plug 250. In the example of FIG. 5, a profile of the plug 256 is illustrated that includes a conical portion and a radiused portion that may define an inner diameter $D_{pi}$. As shown, the conical portion may be defined according to a cone angle $\phi_p$ while the radiused portion may be defined with respect to a radius R. As an example, the radiused portion may be referred to as a toroidal portion or a toroidal surface. While the toroidal portion extends to a conical portion in the example of FIG. 4, a toroidal portion may continue as a radiused portion or extend to a non-conical or other portion. As an example, a plug can include toroidal surface disposed between an inner diameter and an outer diameter of a plug (e.g., a toroidal surface disposed between $D_{pi}$ and $D_{po}$).

Figure 6:
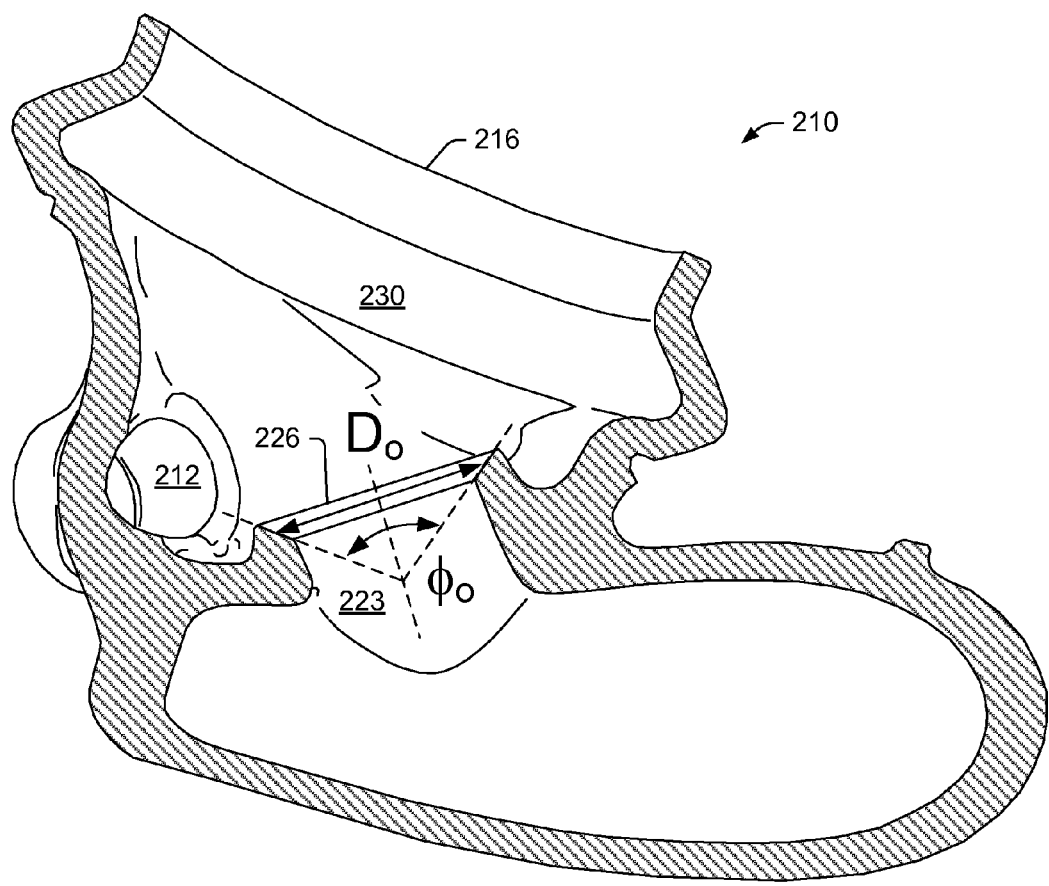
FIG. 6 is a cutaway view of an example of a turbine housing.

FIG. 6 shows a cutaway view of the turbine housing 210, particularly to show a relationship between the bore 212 and the wastegate seat 226 as these features cooperate with a wastegate arm and plug such as the wastegate arm and plug 250. As shown in the example of FIG. 6, the wastegate wall 223 extends to the wastegate seat 226, which includes a diameter $D_o$ of a cone section disposed at a cone angle $\phi_o$. As an example, an assembly may include a plug with a cone portion having a cone angle of about 60 degrees while a wastegate seat includes a cone portion with a cone angle of about 100 degrees. In such an example, contact may or may not occur between the two cone portions as sealing may be achieved by contact between a toroidal portion of the plug and the cone portion of the wastegate seat.

Figure 7:
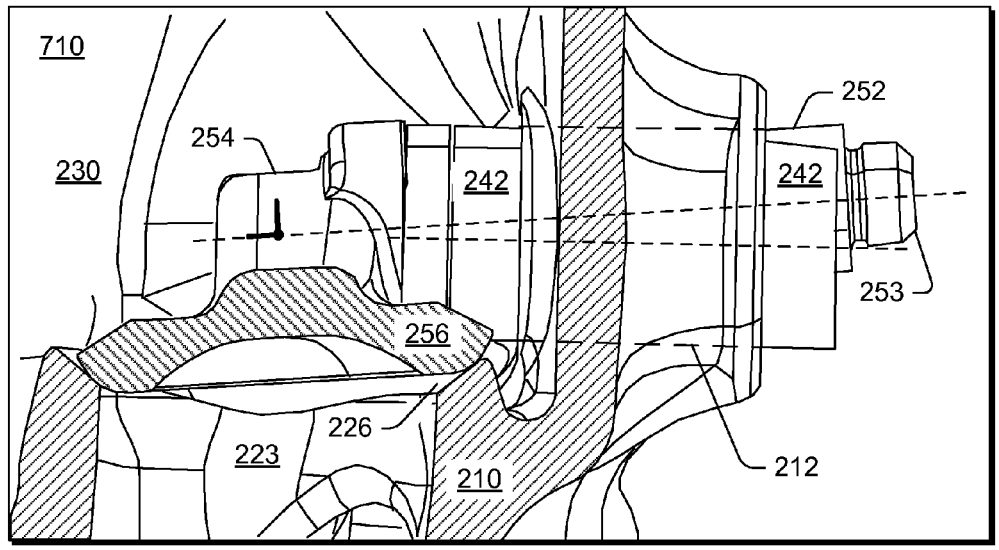
FIG. 7 is a series of cutaway views of a wastegate arm and plug in two different orientations.
Figure 7:
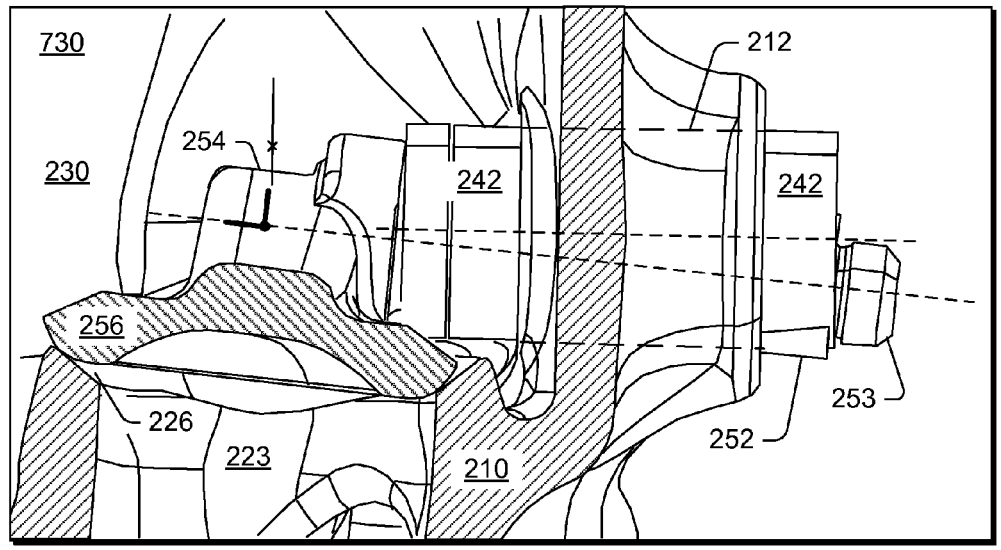

FIG. 7 shows two displaced orientations 710 and 730 of the wastegate arm and plug 250 within the assembly 200, in particular, where the axis of the shaft 252 of the wastegate arm and plug 250 is not aligned with, for example, the axis of the bore 212 (e.g., and the axis of the bushing 242 disposed in the bore 212).

In the orientations 710 and 730, contact exists between the plug 256 and the wastegate seat 226. In particular, contact exists between a radiused portion (e.g., toroidal portion) of the plug 256 and a conical portion of the wastegate seat 226. As an example, the orientations 710 and 730 may represent maximum angular misalignments with respect to a bore axis of a bore (e.g., ±5 degrees), for example, where some angular misalignment with respect to a bushing axis of a bushing disposed in the bore (e.g., ±1 degree). As mentioned, for a variety of reasons, some misalignment may occur (e.g., during assembly, during operation, etc.).

Figure 8:
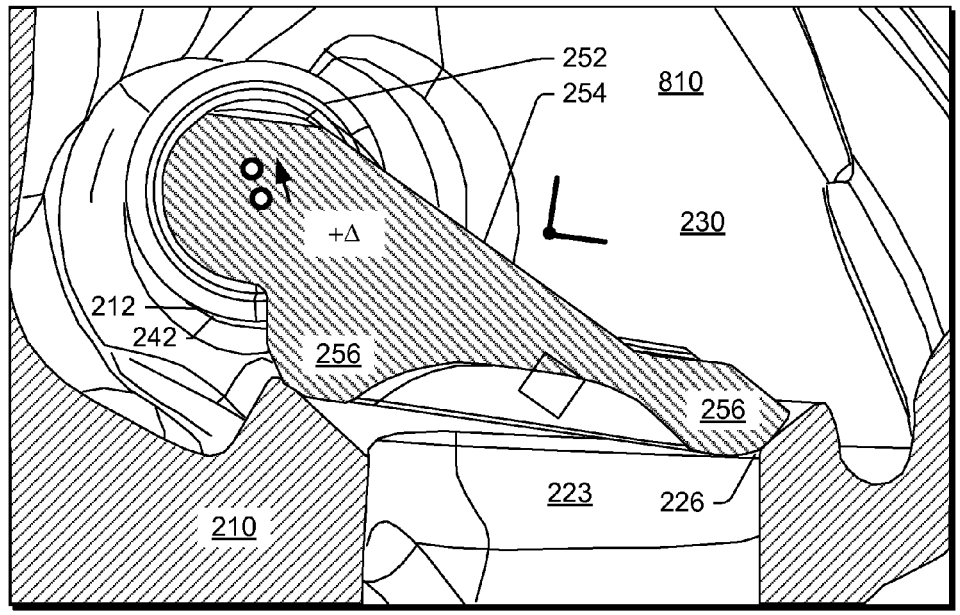
FIG. 8 is a series of cutaway views of a wastegate arm and plug in two different orientations.
Figure 8:
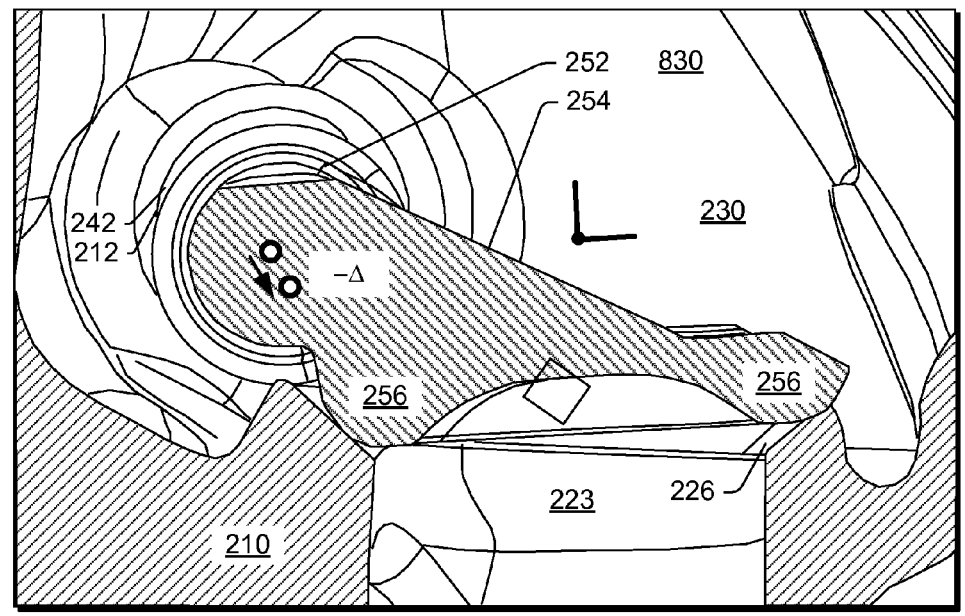

FIG. 8 shows two displaced orientations 810 and 830 of the wastegate arm and plug 250 within the assembly 200, in particular, where the axis of the shaft 252 of the wastegate arm and plug 250 is not aligned with, for example, the axis of the bore 212 (e.g., and the axis of the bushing 242 disposed in the bore 212).

In the orientations 810 and 830, contact exists between the plug 256 and the wastegate seat 226. In particular, contact exists between a radiused portion (e.g., toroidal portion) of the plug 256 and a conical portion of the wastegate seat 226. As an example, the orientations 810 and 830 may represent maximum displacement misalignments (e.g., Δ) with respect to a bore axis of a bore (e.g., ±1.6 mm), for example, where some displacement misalignment with respect to a bushing axis of a bushing disposed in the bore (e.g., ±0.1 mm). As mentioned, for a variety of reasons, some misalignment may occur (e.g., during assembly, during operation, etc.).

As an example, a wastegate arm and plug may include extreme positions inside a bushing disposed in a bore of a turbine housing while being able to maintain contact with a wastegate seat for purposes of sealing a wastegate passage (e.g., adequate sealing for acceptable performance).

Figure 9:
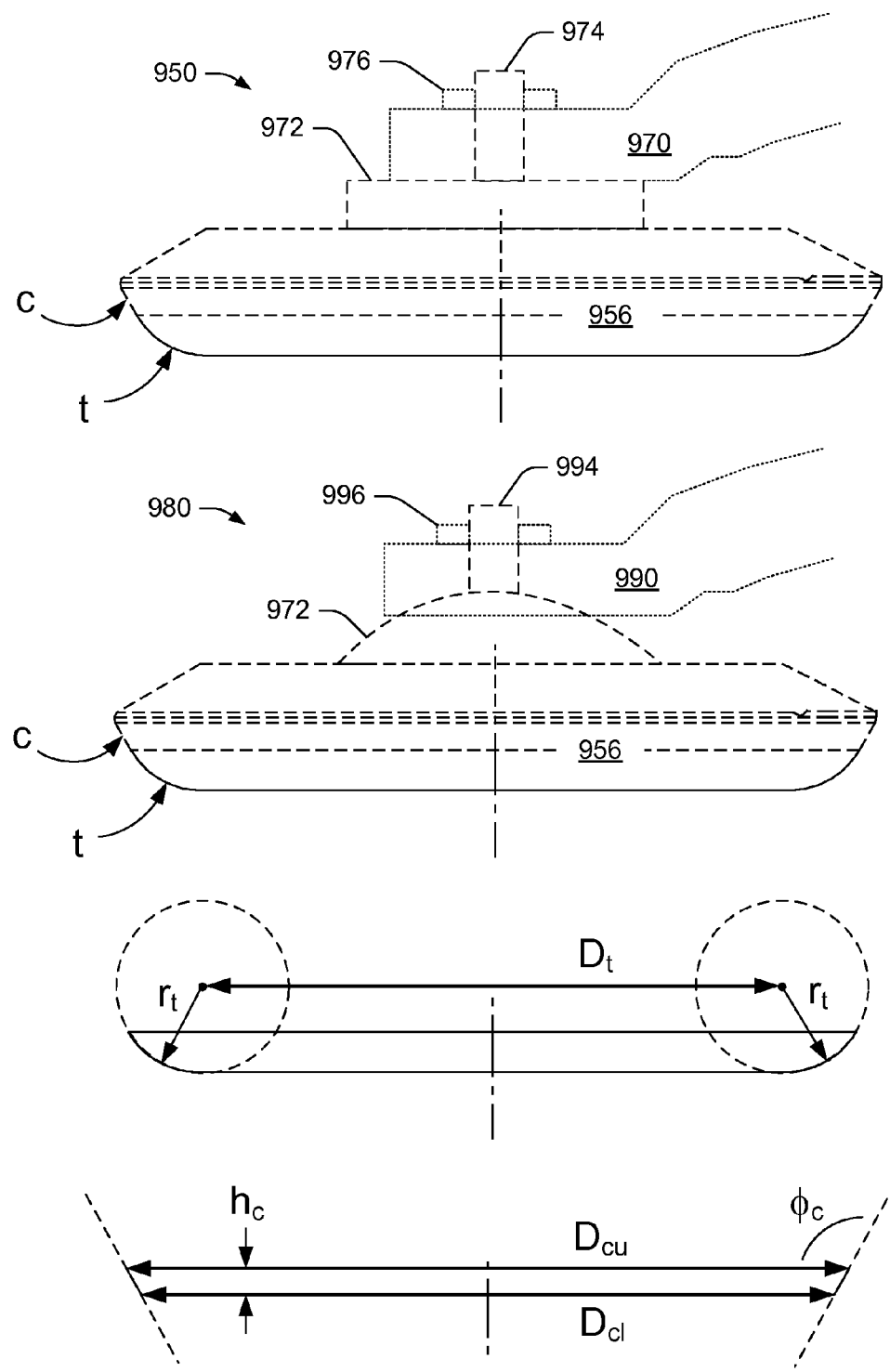
FIG. 9 is a series of diagrams of examples of wastegate arm and plug and profiles thereof.

FIG. 9 shows examples of a wastegate arm and plug 950 and 970, which may be a unitary wastegate arm and plug or a wastegate arm and plug assembly. As an assembly, a plug portion 956 may include an attachment base 972 or 992 from which a stem 974 or 994 extends where an arm 970 or 990 fits to the stem 974 or 994, which is secured to the stem 974 or 994 via an attachment component 976 or 996 (e.g., a press-fit ring, etc.). In the example wastegate arm and plug 970, a surface of an attachment base 992 may be defined at least in part by a portion of a sphere. In such an example, the arm 990 may include a surface defined at least in part by a portion of a sphere. In such an example, some pivoting may be provided for the plug portion 956 with respect to the arm 990 (e.g., as provided by some amount of clearance or clearances with respect to the stem 994).

In the example of FIG. 9, the plug portion 956 includes a toroidal portion "t" and, for example, optionally a conical portion "c". As shown, the optional conical portion may be defined by an angle $\phi_c$, a height $h_c$, and at least one of a lower diameter $D_{cl}$ and an upper diameter $D_{cu}$. In the example of FIG. 9, the toroidal portion may be defined by a diameter $D_t$ and a radius $r_t$, for example, where the toroidal portion may be defined by a circular torus.

Figure 10:
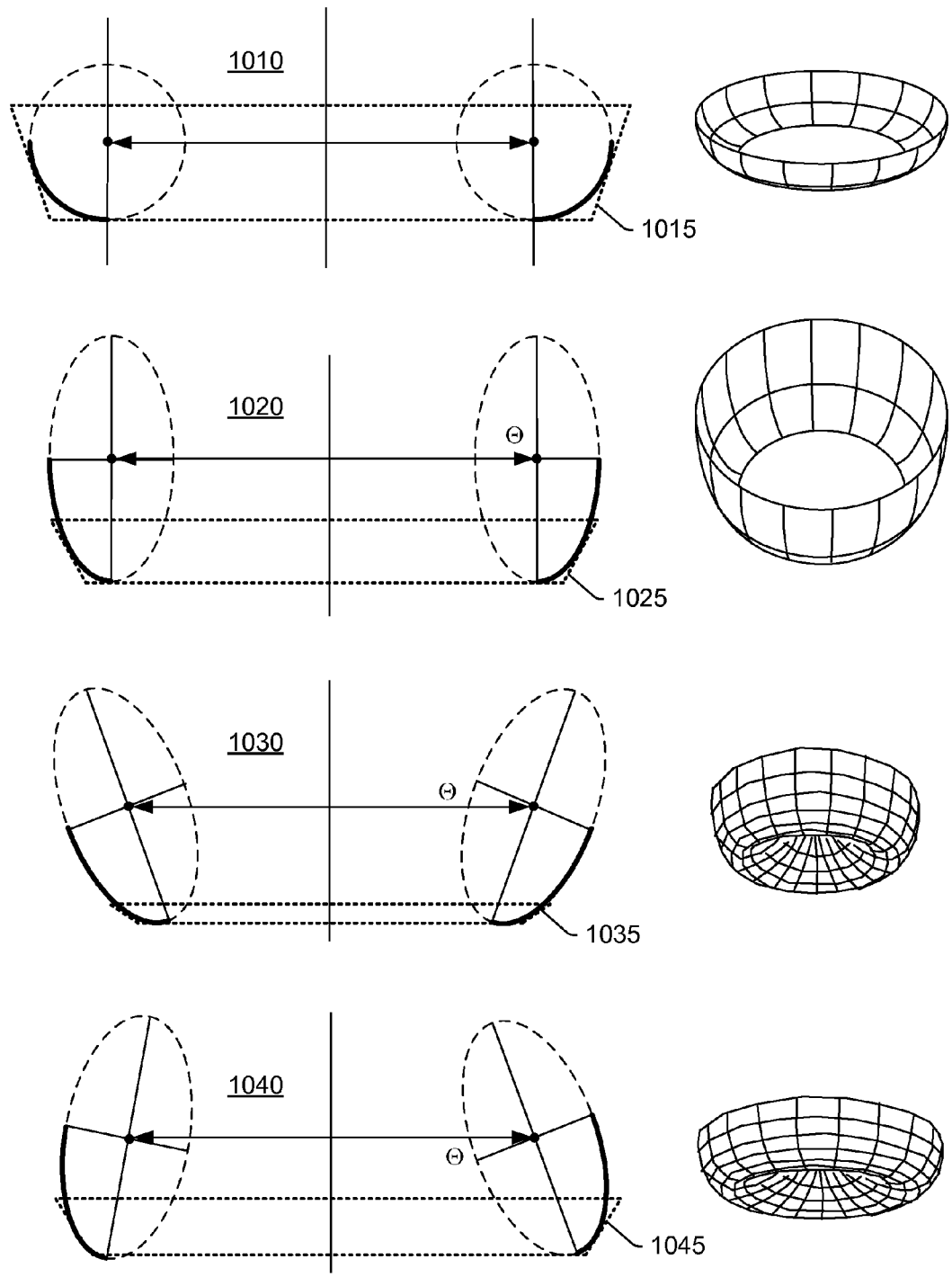
FIG. 10 is a series of views of examples of profiles of a plug.

FIG. 10 shows some examples of toroidal portion profiles of a plug 1010, 1020, 1030 and 1040 along with some examples of seat profiles 1015, 1025, 1035 and 1045. Also shown in FIG. 10 are gridded surfaces that may approximate respective toroidal portions.

As to the example profile 1010, the toroidal portion corresponds to a circle, as to the example profile 1020, the toroidal portion corresponds to an ellipse, as to the example profile 1030, the toroidal portion corresponds to an inwardly tilted ellipse and, as to the example profile 1040, the toroidal portion corresponds to an outwardly tilted ellipse. In the examples 1010, 1020, 1030 and 1040 of FIG. 10, a thick solid line represents a profile that may be a profile of a plug, for example, such as the plug 256. As to the seat profiles 1015, 1025, 1035 and 1045, the dotted lines may represent a profile that may be a profile of a seat, for example, such as the seat 226.

Figure 11:
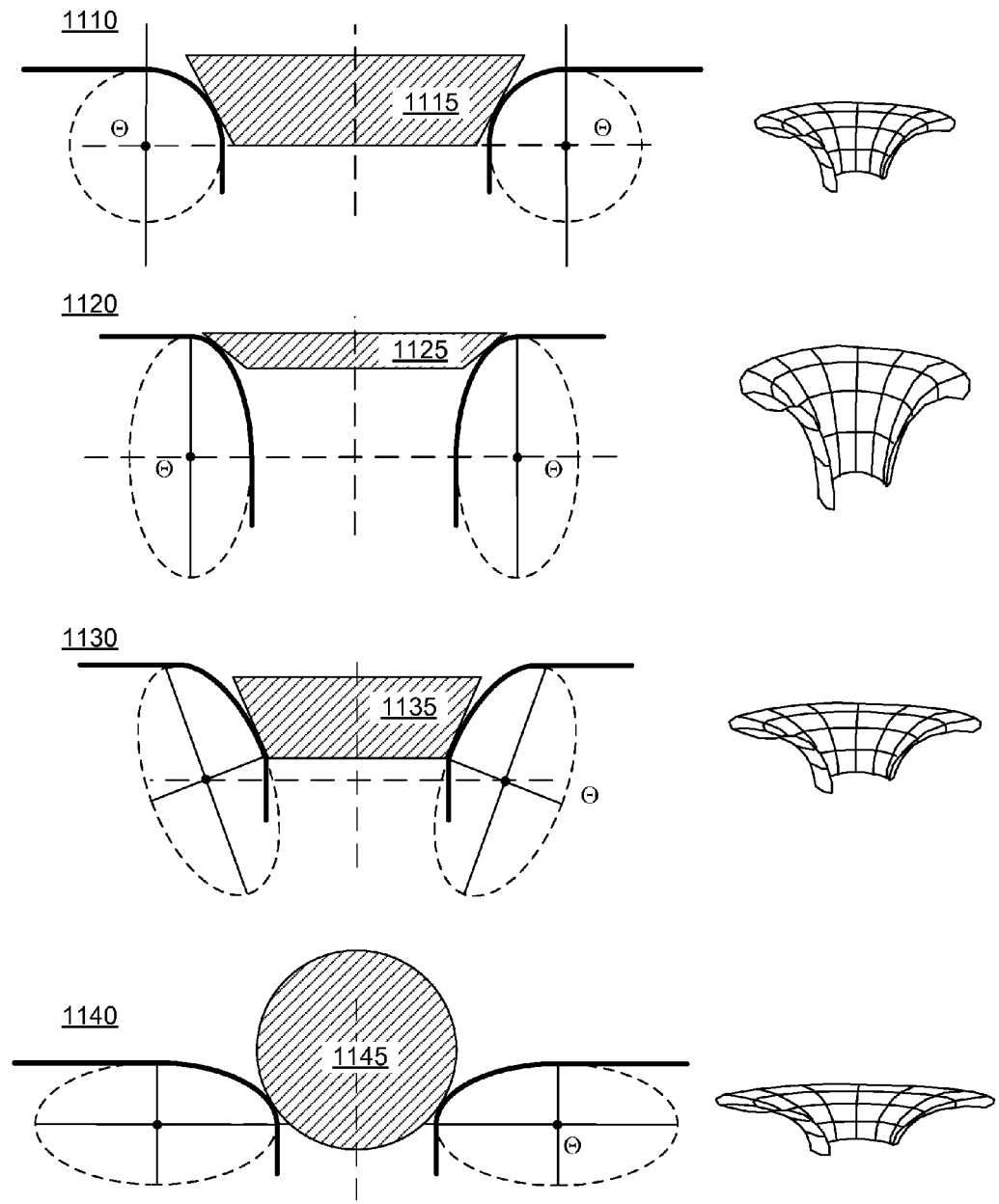
FIG. 11 is a series of views of examples of profiles of a seat.

FIG. 11 shows some examples of seat profiles of a wastegate seat 1110, 1120, 1130 and 1140 along with some examples of plug profiles 1115, 1125, 1135 and 1145. Also shown in FIG. 11 are gridded surfaces that may approximate respective seat profiles. As to the example profile 1110, the seat may be defined by a toroidal portion that corresponds to a circle, as to the example profile 1120, the seat may be defined by a toroidal portion that corresponds to an ellipse, as to the example profile 1130, the seat may be defined by a toroidal portion that corresponds to an outwardly tilted ellipse and, as to the example profile 1140, the seat may be defined by a toroidal portion that corresponds to an ellipse (e.g., rotated 90 degrees in comparison to the example 1120). In the examples 1110, 1120, 1130 and 1140 of FIG. 11, a thick solid line represents a profile that may be a profile of a seat, for example, such as the seat 226. As to the plug profiles 1115, 1125, 1135 and 1145, they may be a profile of a plug, for example, such as the plug 256. As shown in FIG. 11, a plug may include a conical profile or a spherical profile. As shown in various other examples, a plug may include a toroidal profile.

Figure 12:
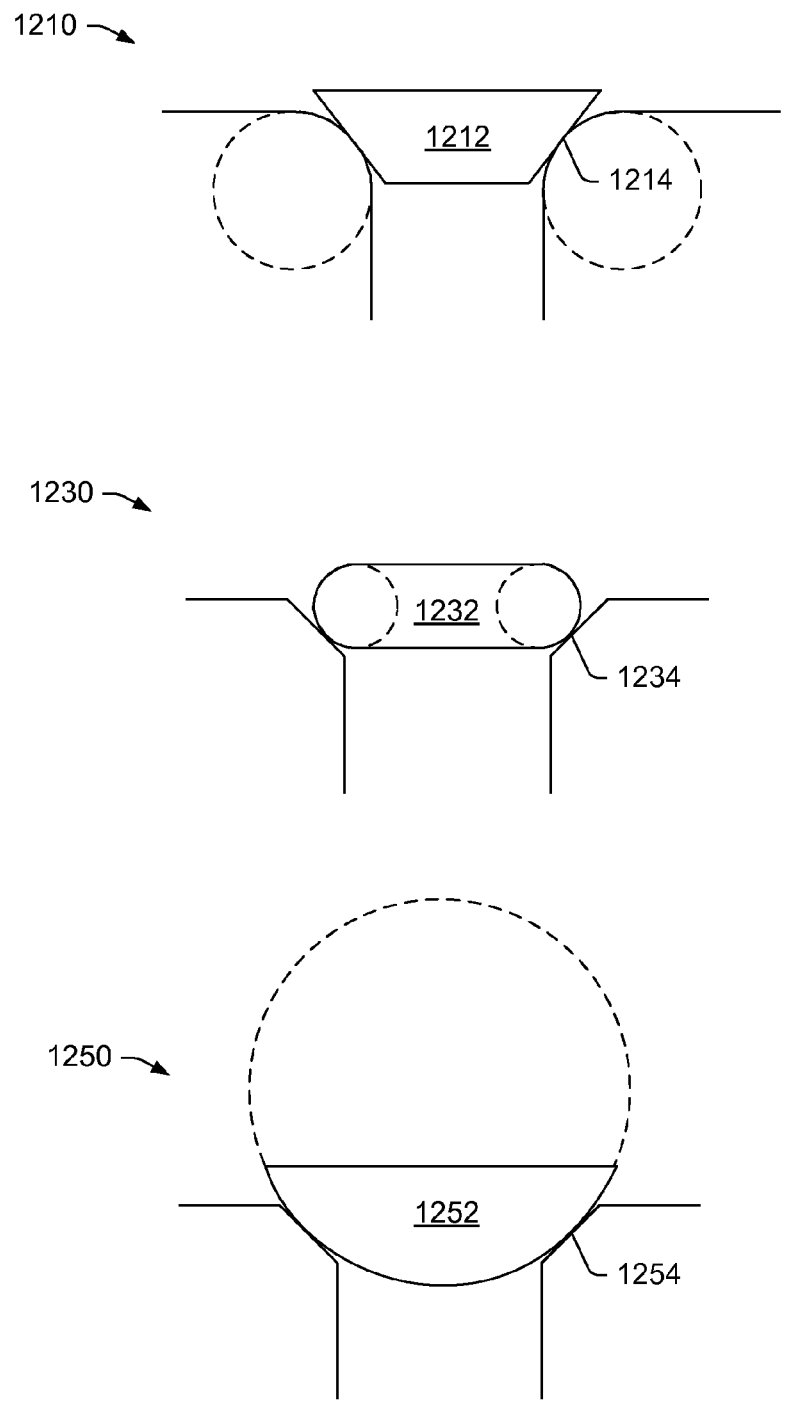
FIG. 12 is a series of views of examples of turbine wastegate plugs and seats.

FIG. 12 shows some examples of turbine wastegates 1210, 1230 and 1250. In the example 1210, a plug 1212 includes a conical shape and a seat 1214 includes a radiused shape (e.g., a portion of a toroidal surface). In the example 1230, a plug 1232 includes a radiused shape (e.g., a portion of a torodial surface) and a seat 1234 includes a conical shape. In the example 1250, a plug 1252 includes a radiused shape (e.g., a portion of a spherical surface) and a seat 1254 includes a conical shape. In the examples of FIG. 12, a torus may be defined by a radius (or major and minor axes) and a diameter and a sphere may be defined by a radius; noting that a spherical section may be defined by a surface cutting a sphere. As an example, a cone or conical portion may be defined by an angle and an axis and, for example, a position or positions along the axis.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a torus, for contacting the wastegate seat to cover the wastegate passage. In such an assembly, the wastegate shaft, the wastegate arm and the wastegate plug may be a unitary component.

As an example, a wastegate plug can include a profile defined in part by a portion of a cone. As an example, a wastegate seat can include a profile defined in part by a cone.

As an example, wastegate plug can include a profile defined in part by a portion of the torus where that portion is disposed between an inner diameter and an outer diameter of the wastegate plug.

As an example, an assembly can include a wastegate shaft with an axis where a turbine housing includes a bore with an axis. In such an example, for a predetermined angular misalignment of the axes, a wastegate plug connected to the wastegate shaft can include a profile defined in part by a portion of a torus where along that profile, the wastegate plug provides for contacting a wastegate seat to cover a wastegate passage.

As an example, an assembly can include a wastegate shaft with an axis where a turbine housing includes a bore with an axis. In such an example, for a predetermined displacement misalignment of the axes, a wastegate plug connected to the wastegate shaft can include a profile defined in part by a portion of a torus where along that profile, the wastegate plug provides for contacting a wastegate seat to cover a wastegate passage.

As an example, a wastegate plug may include a profile defined in part by a torus, for example, an elliptical torus having a minor axis length that differs from a major axis length. In such an example, an elliptical torus may include a tilt angle (e.g., where the major axes are not parallel).

As an example, a profile of a wastegate plug can include a conical angle defined by a tangent to a maximum outer diameter of the torus. In such an example, a wastegate seat can include a conical angle where the conical angle of the wastegate seat exceeds the conical angle of the wastegate plug.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a sphere, for contacting the wastegate seat to cover the wastegate passage. In such an example, the wastegate shaft, the wastegate arm and the wastegate plug may be a unitary component. As an example, a wastegate seat can include a profile defined in part by a cone while a wastegate plug can include a profile defined at least in part by a sphere. As an example, a wastegate shaft can include an axis and a bore for receipt of the wastegate shaft can include an axis where, for a predetermined displacement misalignment of the axes, a wastegate plug, along a profile defined in part by at least a portion of a sphere, provides for contacting a wastegate seat to cover a wastegate passage. In such an example, the wastegate seat may include a portion defined at least in part by a cone.

As an example, an assembly can include a turbine housing that includes a bore, a wastegate seat and a wastegate passage that extends to the wastegate seat, where the wastegate seat includes a profile, defined in part by a portion of a torus; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a cone, for contacting the wastegate seat to cover the wastegate passage. In such an example, the wastegate shaft, the wastegate arm and the wastegate plug may be a unitary component. As an example, a portion of a torus can include a portion of an elliptical torus having a minor axis length that differs from a major axis length. In such an example, the elliptical torus may include a tilt angle.

As an example, a wastegate shaft can include an axis and a bore for receipt of the wastegate shaft may include an axis where, for a predetermined displacement misalignment of the axes, a wastegate plug, along a profile defined in part by a portion of the cone, provides for contacting a wastegate seat, along a profile defined in part by a portion of a torus, to cover a wastegate passage.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
   a turbine housing that comprises a bore that defines a bore axis, a wastegate seat and a wastegate passage that extends to the wastegate seat wherein the wastegate seat comprises a conical portion with a profile defined by a portion of a cone that defines a wastegate seat axis;
   a bushing received by the bore wherein the bushing defines a bushing axis;
   a rotatable wastegate shaft that defines a wastegate shaft axis, the rotatable wastegate shaft received by the bushing wherein the rotatable wastegate shaft comprises a shaft end and a shoulder;
   a control arm coupled to the wastegate shaft wherein the bushing is disposed between the shoulder of the wastegate shaft and the control arm with an axial clearance;
   an actuator coupled to the control arm;
   a wastegate arm extending from the wastegate shaft; and
   a wastegate plug extending from the wastegate arm wherein the wastegate plug comprises a toroidal portion with a profile defined by a portion of a torus that defines a wastegate plug axis wherein the toroidal portion contacts the conical portion of the wastegate seat responsive to force applied by the actuator to the wastegate shaft via the control arm that angularly displaces the wastegate shaft axis with respect to the bore axis and the bushing axis, that axially displaces the wastegate shaft with respect to the bore and that forcibly seats the toroidal portion of the wastegate plug with respect to the conical portion of the wastegate seat wherein the force acts to reduce misalignment of the wastegate plug axis and the wastegate seat axis.

2. The assembly of claim 1 wherein the wastegate shaft, the wastegate arm and the wastegate plug comprise a unitary component.

3. The assembly of claim 1 wherein the wastegate plug comprises a conical portion with a profile defined in part by a portion of a cone.

4. The assembly of claim 1 wherein the profile defined by the portion of the torus is disposed between an inner diameter and an outer diameter of the wastegate plug.

5. The assembly of claim 1 wherein the torus comprises a portion of an elliptical torus having a minor axis length that differs from a major axis length.

6. The assembly of claim 5 wherein the elliptical torus comprises a tilt angle.

7. The assembly of claim 1 wherein the wastegate plug comprises a conical portion with a conical angle defined by a tangent to a maximum outer diameter of the torus, wherein the conical portion of the wastegate seat comprises a conical angle, and wherein the conical angle of the wastegate seat exceeds the conical angle of the wastegate plug.

8. An assembly comprising:
- a turbine housing that comprises a bore that defines a bore axis, a wastegate seat and a wastegate passage that extends to the wastegate seat, wherein the wastegate seat comprises a toroidal portion with a profile defined by a portion of a torus that defines a wastegate seat axis;
- a bushing received by the bore wherein the bushing defines a bushing axis;
- a rotatable wastegate shaft that defines a wastegate shaft axis, the rotatable wastegate shaft received by the bushing wherein the rotatable wastegate shaft comprises a shaft end and a shoulder;
- a control arm coupled to the wastegate shaft wherein the bushing is disposed between the shoulder of the wastegate shaft and the control arm with an axial clearance;
- an actuator coupled to the control arm;
- a wastegate arm extending from the wastegate shaft; and
- a wastegate plug extending from the wastegate arm wherein the wastegate plug comprises a conical portion with a profile defined by a portion of a cone that defines a wastegate plug axis wherein the conical portion contacts the toroidal portion of the wastegate seat responsive to force applied by the actuator to the wastegate shaft via the control arm that angularly displaces the wastegate shaft axis with respect to the bore axis and the bushing axis, that axially displaces the wastegate shaft with respect to the bore and that forcibly seats the conical portion of the wastegate plug with respect to the toroidal portion of the wastegate seat wherein the force acts to reduce misalignment of the wastegate plug axis and the wastegate seat axis.

9. The assembly of claim 8 wherein the wastegate shaft, the wastegate arm and the wastegate plug comprise a unitary component.

10. The assembly of claim 8 wherein the torus comprises a portion of an elliptical torus having a minor axis length that differs from a major axis length.

11. The assembly of claim 10 wherein the elliptical torus comprises a tilt angle.

* * * * *